May 27, 1941. G. A. TINNERMAN 2,243,266
CONNECTION FOR KNOBS AND THE LIKE
Filed Oct. 31, 1938
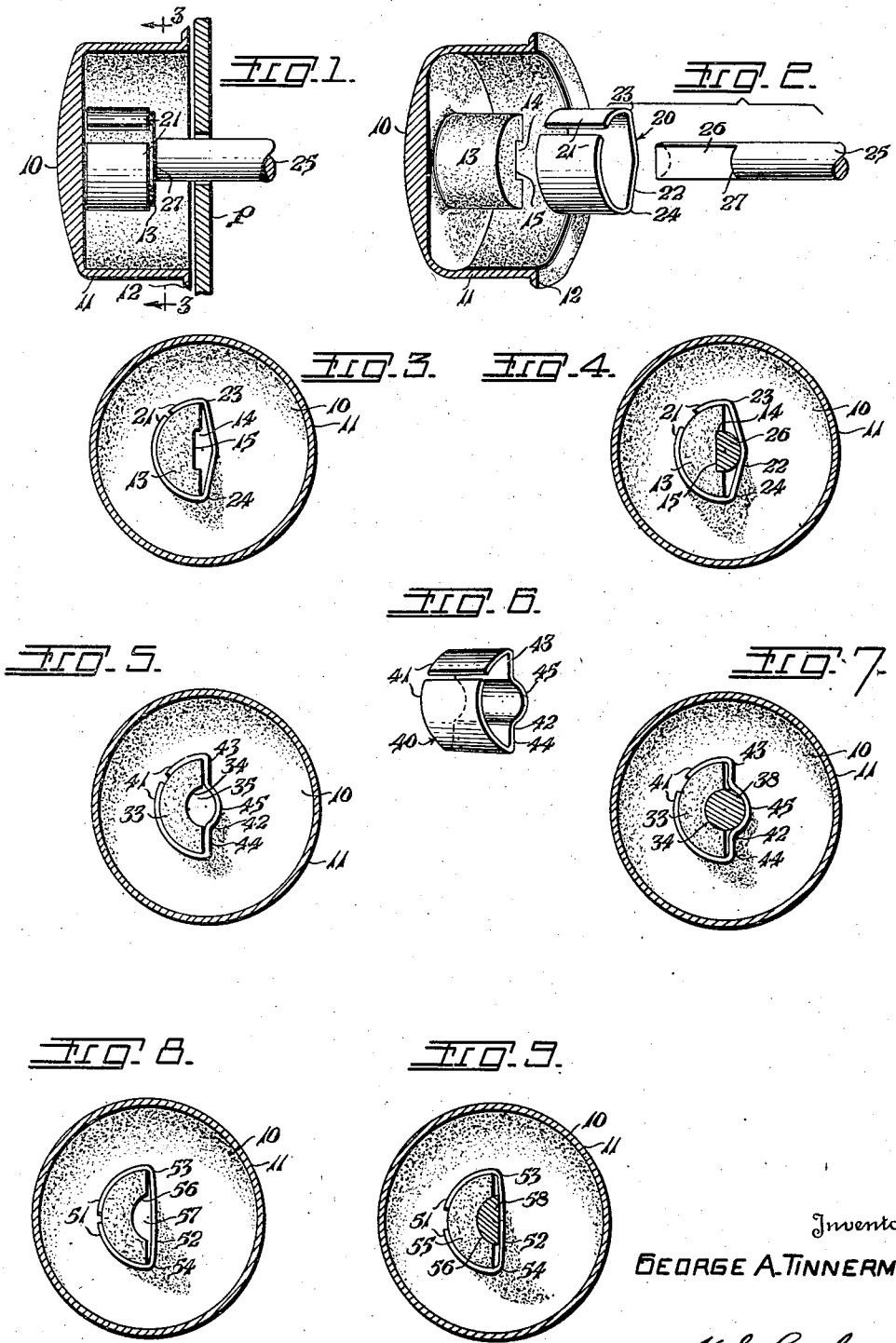
Inventor:
GEORGE A. TINNERMAN
H. S. Lombard,
Attorney Patented May 27, 1941

2,243,266

UNITED STATES PATENT OFFICE 2,243,266

CONNECTION FOR KNOBS AND THE LIKE

George A. Tinnerman, Rocky River, Ohio, assignor, by mesne assignments, to Tinnerman Products, Inc., Cleveland, Ohio, a corporation of Ohio Application October 31, 1938, Serial No. 238,045

7 Claims. (Cl. 287—53)

This invention relates to improved connections for knobs, handles and like parts attached to shafts, rods, spindles, etc. in fixedly held relation against rotative as well as axial movement whereby they may be effectively operated as in turning operations and the like without causing objectionable looseness, wobble, and side play in the connection.

More particularly, the present invention is directed to improved means for detachably connecting an operating member or the like, formed of comparatively fragile material, to a shaft or stem employed, for example, as the adjusting element for a radio control unit. An example of such installations is shown in applicant's copending application Serial Number 179,536, filed December 13, 1937, and since issued as Patent Number 2,136,160, November 8, 1938.

A preferred form of such knob or like adjusting element is usually constructed in a one piece device of hardened plastic material such as Bakelite, Tenite, Plaskon, synthetic rubber compositions, celluloid, etc. In attaching such articles to shaft stems, rods, spindles and the like, it has been the recent practice to provide a central hub on the plastic part formed with a socket opening into which an end of the shaft is wedged together with expedient anchoring means for retaining the knob and shaft stem against relative rotative as well as relative axial movement; and to this end various anchoring or retaining means such as set screws, spring friction and clutch devices and the like have been employed which in any heretofore known form, exert a binding or wedging action between the shaft and the inner side walls of the socket opening in the hub.

It is common knowledge that the plastic composition of the connecting hub on any such plastic part is fragile and quite brittle and when thus provided with a socket opening receiving the shaft together with anchoring means exerting a binding or wedging action between the shaft and inner side walls of the socket opening, there frequently occurs a splitting or fracture of the connecting hub in the application of the shaft stem thereto or incident to strain taking place after a period of use with the result that even though the knob is not completely broken, it is so loosely fitted to the shaft that it is practically useless and must be replaced anyway.

A primary object of the present invention therefore, is to provide an improved knob connection or the like which overcomes all the insufficiencies of the prior art structures in the use of solid, compact form of connecting hub of such size and proportions as to defeat any possibility of splitting or breaking and which connecting hub is employed in combination with a spring retaining collar clamping the same to a shaft in a rigid, positive connection against relative rotative as well as relative axial movement.

A further object of the invention is to provide simple and easily installed means for connecting a knob or the like to a shaft, said means comprising an enlarged connecting hub for added strength and a spring retaining collar reinforcing the material of said connecting hub and otherwise presenting a socket opening for receiving the shaft in such manner as to take the thrust incident to turning movements of the knob, wherefore possibility of splitting or breaking of the connecting hub is minimized and practically eliminated.

Still another object of the invention contemplates the provision of an improved means for connecting an operating member or like part to a shaft, said means comprising a simple form of connecting hub provided on the operating member at very low cost and so designed for use with a spring retaining collar as to present a socket opening for receiving the shaft and otherwise provide a connection which may be assembled quickly and easily mounted or detached from the shaft without the use of tools and which connection is efficient at all times and not subject to looseness, side play or wobble of any nature.

Another principle purpose of the invention is to provide a means for connecting a plastic knob or the like to a shaft by an improved construction in which neither the knob nor the shaft is weakened and separate, automatic retaining means is applied to the connecting hub of the knob in such manner as to reinforce the plastic material thereof and provide a continuously effective, rigid, clamping connection wherein the knob is secured directly to the shaft against relative axial as well as relative rotative movement.

A more specific object contemplates the provision of a means for connecting a plastic part to a shaft having a reduced portion or stem having a flat side face adapted for rigid, positive engagement with a flat side wall provided on the connection hub of the plastic part under the compressive force of a spring collar device embracing both the hub and shaft to urge the same toward continuously effective clamping engagement, thereby positively retaining the plastic part against rotative as well as relative axial movement in assembled relation with the shaft.

Further objects and advantages, and other new and useful features in the construction, arrangement and general combination of parts of the invention, will be readily apparent to those skilled in the art as a description thereof proceeds with reference to the accompanying drawing in which like reference characters designate like parts throughout the same, and in which:

Fig. 1 is a side view, partly in section, showing one form of the improved connecting means of the invention as embodied in a panel knob for an instrument control shaft;

Fig. 2 is a perspective view showing details of construction of the component parts of the assembly represented in Fig. 1, comprising a panel knob shown partly in section, a spring retainer collar, and a shaft having a reduced end portion or stem;

Fig. 3 is a sectional view, taken along line 3—3 of Fig. 1, looking in the direction of the arrows, showing the spring collar device as applied to self retaining assembled relation with the connecting hub prior to insertion of the shaft stem in the socket opening thereby provided.

Fig. 4 is a similar view showing the shaft stem, represented in section, as applied to firm, rigid connected engagement in the socket presented by the connecting hub and spring collar as shown in Fig. 3;

Fig. 5 is a view similar to Fig. 3 showing another embodiment of the invention comprising a connecting hub and spring collar arrangement providing a socket opening especially adapted for receiving a substantially round shaft;

Fig. 6 is a perspective view of the spring collar per se employed in Fig. 5;

Fig. 7 shows a completed assembly of this form of the invention, the round shaft being represented in section;

Fig. 8 is a view similar to Fig. 3 disclosing a further embodiment of the invention in which the connecting hub and spring collar arrangement are designed to provide a socket opening particularly suited for receiving a substantially D-shaped shaft stem; and, Fig. 9 shows a completed assembly of this character with the D-shaped shaft stem received in the socket opening and having its flat side face in bearing engagement with the substantially flat side section of the spring collar designed to take practically the entire thrust and strain set up in the connection incident to turning operations and the like.

The connecting means of the present invention is one of general utility and the primary object contemplates the provision of a simple and inexpensive fastening arrangement which may be easily embodied in any installation wherein a knob, handle or other article of manufacture is to be detachably secured to a shaft, rod, spindle or the like.

The principal improvement of the invention resides in the arrangement whereby a relatively large, solid, compact connecting hub is provided of such size and proportions as to provide for any required strength against splitting or breaking either in the initial assembly thereof with a cooperating shaft or incident to strain set up in the connection after a period of use in an installation. At the same time, the connecting hub is preferably provided on a plastic knob or like part as a simple, one piece element and this of course, greatly facilitates the quantity production of a high grade article at minimum cost inasmuch as only the simplest molding equipment is required.

Moreover, the instant connecting hub arrangement requires only the use of a simple, inexpensive, spring retaining collar which is entirely concealed from view in a completed installation and otherwise eliminates expensive and time consuming drilling, tapping and broaching operations heretofore necessary in producing such articles in addition to dispensing with the use of set screws and special forms of spring friction and clutch devices for exerting a binding or wedging action on the shaft. In this respect, it is to be recognized that the improved spring collar construction involves a decided advantage over heretofore known devices in that the spring collar device clamps directly upon both the connecting hub and shaft in holding these parts together and thereby not only reinforces and bolsters the fragile plastic material of the connecting hub, but also serves to take the major portion of the thrust and strain transmitted by the shaft in turning movements and other operations.

Another principal feature of the invention resides in the operative relation of the connecting hub and the spring collar fastening device employed therewith which is so designed as to be held in self retaining position on the connecting hub to present a socket opening preparatory to the assembly of the shaft therewith in providing for an easy and quick attachment of a knob or other object in proper position in an installation in a minimum of time and effort.

In the accompanying drawings, the invention is shown with reference to knob or handle members such as may be employed as panel knobs on radio sets or as control members on automobile and aeroplane instrument panels; it is to be understood however that the improved connecting means is not limited to the types of devices herein illustrated and described since it is quite obvious that the invention is equally adaptable to use as the means for securing, mounting or connecting various other articles of manufacture to shafts, rods, spindles and the like.

In the embodiment of the invention represented in Figs. 1-4 inclusive, there is shown by way of illustration, an application of the improved connecting means as employed in a panel knob arrangement for an instrument control shaft of a radio apparatus, for example. The knob designated generally 10, Figs. 1 and 2, is formed of any suitable material, preferably a plastic composition molded into a compact, one piece device of any selected size or shape. Usually the knob is substantially annular in outward appearance and generally cup-shaped in section to provide an imperforate body 11 and if desired, a peripheral flange 12 on which may be formed dial graduations, pointers, symbols, and similar indicating means in a well known manner.

Within the knob there is provided a connecting hub 13 which in the case of a plastic molded part, is an integral stud element readily formed in the molding operation producing the finished knob or the like at very little added cost. The said hub 13, may of course assume any selected size or shape and if desired may be provided in the form of an integral projecting stem comprising the center area of a plastic part molded solid throughout. As best seen in Figs. 2 and 3, the connecting hub is preferably provided in the manner of a relatively large, substantially semicylindrical central stud element extending axially of the knob body. It will be readily apparent that in providing the connecting hub of such simple cross-section and configuration, only the simplest molding equipment is required.

A further advantage resides in the fact that a simple connecting hub of this character on being provided in the manner of a one-piece stud element, may be formed as a solid, substantial post in a knob or the like otherwise hollow throughout such that in quanity production, a considerable saving is obtained in the amount of material required and other costs of manufacture. At the same time, the connecting hub may be readily formed in an enlarged size as compared to the cross-section of its cooperating shaft to be of such strength and durability as to eliminate any possibility of splitting, cracking or breaking from its foundation under strain taking place in the application of the shaft thereto or after a period of use in an installation. In this respect, it will be understood that the connecting hub arrangement of the present invention involves a most decided advantage in that it eliminates entirely the necessity for strengthening ribs, webs, inserts and similar reinforcing means heretofore found necessary in the design of the connecting means for such knobs and similar articles of manufacture.

The connecting hub provided on the knob or the like in the manner aforesaid, is preferably formed with an axially extending recess 14 along its flat face as illustrated in Fig. 3, the width of said recess being approximately that of the diameter of the cooperating shaft stem and otherwise suitably designed in accordance with the shape of such stem to snugly receive the same in firm, rigid, frictional gripping relation therewith. Thus the shaft stem may in effect, be of any necessary or desired cross section such as round, D-shaped, triangular, rectangular or other irregular flat sided or polysided configuration, in which relation the axial recess in the connecting hub is suitably designed of corresponding shape to provide an even, precise fit for the shaft stem when assembled therewith. Any such recess is usually provided for in the molding operation of the plastic knob itself but of course, the same may be provided anytime thereafter in a completed article by simple, grinding, milling or broaching operations. As shown in Figs. 3 and 4, an expedient form of recess 14 is provided along the flat face of the connecting hub in the manner of a simple rectangular cavity presenting a flat side wall 15 against which the flat side face of a cooperating D-shaped stem is seated in rigid, non-rotatable engagement under the compressive force of a spring collar device 20, Fig. 2, designed to embrace the outer surfaces of both the connecting hub and shaft stem to maintain the same in positive clamped, connected engagement in a completed installation, as hereinafter more fully set forth.

The spring collar device 20, is constructed of any suitable material, preferably spring steel and, generally speaking, is provided in such form and shape as to correspond substantially to the contour of the overall cross-sectional area of the connecting hub and shaft stem when assembled and thereby serve to maintain these parts in firm, rigid, clamped engagement under continuously effective spring tension. However, it is most desirable and in many instances, absolutely necessary that the spring collar device be capable of self-retaining position on the connecting hub in assembled relation therewith preparatory to the application of the shaft stem thereto. Accordingly, the spring collar is formed with a flat side section 22 extending generally along the flat face of the connecting hub together with split end sections 21 corresponding substantially to the outer contour of the connecting hub; said end sections are split preferably of unequal length to facilitate assembly of the spring collar onto the connecting hub as presently to be described. It will be noted however, that the said side section 22 of the spring collar is slightly bowed and this arrangement not only serves to accommodate the outer periphery of the shaft stem when applied thereto as shown in Fig. 4, but also provides distinct shoulders 23, 24, intended to abut the adjacent corner portions of the connecting hub to hold the spring collar in self-retaining position thereon preparatory to the application of the cooperating shaft stem thereto. The spring collar otherwise is designed as respects its split end sections 21, to be somewhat smaller in section when normally untensioned, than the cross-sectional area of the connecting hub in order to obtain the necessary gripping relation thereof with the connecting hub in providing for this most desirable self-retaining characteristic.

From the foregoing, it will be understood that the elements comprising the improved connecting means in the embodiment just described, are readily assembled and mounted in an installation simply by expanding the split spring collar at its free ends and snapping the same onto the connecting hub in the position shown in Fig. 3 with the shoulders 23, 24, thereof automatically holding the same in self-retaining position thereon, as aforesaid. In this relation, the side section 22 of the spring collar together with the axial recess 14 in the connecting hub, present a substantial socket opening designed generally in accordance with the cross-sectional area of the shaft stem applied thereto. The shaft itself designated 25, Fig. 2, is usually plain round rod material but of course, may be of any other selected stock so long as it is provided with a stem 26 preferably of substantial D-shape capable of being snugly received in the socket opening provided by the connecting hub and spring collar, as above set forth. Naturally, round stock is the most desirable since it is the cheapest and requires only a simple, expeditious cutting or grinding operation along one side to provide a cutaway portion forming the desired, substantially D-shaped shaft stem 26, having a shoulder 27 at the inner end thereof.

In any event, the shaft stem 26 thus provided is readily introduced in the socket opening, Fig. 3, presented by the recess 14 in the connecting hub and the side section 22 of the spring collar with the flat face of said stem in abutting relation with the flat side wall 15 of said recess and otherwise disposed in firm, rigid, frictional engagement therein as shown in Fig. 4. To facilitate such application of the shaft stem, the same may be provided with a tapered extremity whereupon it may be easily and quickly inserted in the socket opening and advanced axially therein to fully assembled position to seat the shoulder 27 thereof in abutting relation with the adjacent end face of the connecting hub substantially as shown in Fig. 1, in which relation the rigidity of the connection is materially enhanced. Thus, a hub and spring collar arrangement of this character is admirably suited for use as the connecting means for a knob or the like to be detachably mounted onto the projecting stem of a control shaft passing through a panel P, Fig. 1, for example, of a radio apparatus in which the shaft is not readily accessible from the rear side of the panel for the use of set screws and similar fastenings requiring tools for securing the knob thereto.

During the application of the shaft stem to the socket opening provided by the side section 22 of the spring collar and the connecting hub recess 15, the spring collar will of course expand as necessary such that the split extremities thereof are spread slightly apart as shown in Fig. 4, from their initial position, Fig. 3, thereby permitting the side section 22 of the spring collar to yield as necessary to accommodate the shaft stem and otherwise eliminate any stress or strain which would cause chipping or fracture of the plastic material of the connecting hub as the shaft stem is applied thereto.

From the foregoing, it will be appreciated that the spring collar arrangement of the invention serves not only to reinforce the plastic material of the connecting hub against splitting or breaking incident to strain taking place therein, but also functions most effectively as the retaining means for the connection in maintaining the complementary shaft stem and connecting hub elements in firm, rigid, positive, clamped engagement under continuously effective spring tension, with the flat face of said shaft stem in firm, positive abutting relation with the flat face 15 of the hub recess. Thus, the respective parts of the connection are held positively against relative rotative as well as relative axial movement at all times and the major portion of the thrust or strain taking place in the connection on turning operations is taken up more particularly, by the spring retaining collar device and is not transmitted to the relatively fragile connecting hub such that possibility of chipping or cracking of the plastic material thereof is greatly minimized and in many instances, completely eliminated.

Figs. 5–7 inclusive show a further embodiment of the invention in which the number of parts of the connection and the assembly and operation thereof in an installation is substantially similar to that described with reference to Figs. 1–4 inclusive. This form of connection contemplates the use of a shaft which is substantially round as distinguished from half round, D-shaped or other flat sided configuration. In such instance, in order to provide for the desired non-rotative, fixed relation of the shaft in the socket opening, the connecting hub and spring collar are designed for the greatest possible amount of frictional, gripping contact with the round shaft assembled in the socket opening presented thereby.

Accordingly, as shown in Fig. 5, the connecting hub 33 is provided in the preferred semi-cylindrical configuration with the axial recess 34 formed in the manner of a semicircular cavity and similar side wall corresponding to the general configuration of the round shaft. As in the previously described form of the invention, the spring collar 40, Fig. 6, comprises split end sections 41 and side section 42 which is suitably formed with shoulders 43, 44 designed for abutting relation with the adjacent corner portions of the connecting hub to hold the spring collar in self-retaining position thereon preparatory to the application of the shaft thereto. The side section 42 of the spring collar however, is provided with a pronounced semicircular corrugation or hump 45 conforming substantially to the periphery of the round shaft stem. The spring collar thus provided when snapped onto the connecting hub 33, Fig. 5, presents an irregular socket opening 35 having portions adapted to frictionally and grippingly engage the round shaft around substantially the entire periphery thereof when assembled in the socket opening, to hold the same against relative rotative as well as relative axial movement. This may be readily understood from an inspection of Fig. 7 showing the round shaft as assembled into the socket opening provided in the manner just described, in which relation the spring collar has been expanded as necessary to fully accommodate the shaft and otherwise cause the semicircular corrugation 45 to present with the semicircular recess 34 of the connecting hub, a truly round socket opening for most effectively seating the round shaft and frictionally and grippingly embrace the same around substantially the entire periphery thereof in firm, rigid, positive connected engagement therewith.

Figs. 8 and 9 illustrate still another form of the invention comprising the usual minimum number of simple component parts which are readily embodied in the connecting means of a knob, handle or like installation to operate in a manner substantially similar to that described with reference to Figs. 1 to 4 inclusive. The connecting hub 55 is provided in the form of a strong, compact, generally semicircular stud or post element having an axially extending, substantially semicircular recess 56 in the manner of that shown in Fig. 5. In this instance however, the socket opening presented by the side section 52 of the spring collar and connecting hub recess is substantially D-shaped in a section to receive a correspondingly shaped shaft stem 58, Fig. 9. To this end, the spring collar is formed in the manner of a substantially D-shaped collar slightly smaller when normally untensioned than the overall cross-sectional area of the semicircular hub 55. Also, the spring collar is preferably split midway the length of its hub embracing section to provide substantially equal split end sections 51 designed for more uniform clamping action with the side section 52 which is substantially flat or slightly bowed as shown, to form shoulders 53, 54, designed to hold the spring collar in self-retaining position on the connecting hub when assembled thereon prior to insertion of the shaft in the socket opening presented thereby. As shown in Fig. 8, the socket opening 57 thus provided by the hub recess 56 and side section 52 of the spring collar is substantially D-shaped in section and therefore admirably suited for receiving a correspondingly shaped shaft stem 58 as shown in Fig. 9 with the flat face of the shaft in positive abutting relation with flat portions of the said side section 52. This, together with the uniform clamping action of the end sections 51 maintaining the shaft stem and connecting hub in firm gripping connected engagement, serves to prevent both relative axial and relative rotative movement of the respective parts of the connecting means in operation and use, substantially as set forth with respect to the form of the invention illustrated in Figs. 1 to 4 inclusive. It will be recognized however, that considerable added strength is inherent in this form of the connection by reason of the positive abutting relation of the flat side face of the shaft stem with the substantially flat side section 52 of the spring collar, wherefore practically the entire thrust taking place in the connection on turning operations is transmitted to the strong, metallic spring collar device and no undue stress or strain is set up in the relatively fragile connecting hub element.

In view of the foregoing description, it will be understood that the connecting means of the instant invention, in any embodiment, provides a most simple, inexpensive construction making for a highly practical form of connecting hub arrangement by which a knob or other article of manufacture may be easily and quickly assembled onto a shaft or the like by means of a spring collar device automatically gripping both the shaft and connecting hub in positive, rigid clamping engagement under continuously effective spring tension against relative rotative as well as relative axial movement. As respects relative axial movement, even greater efficiency and a substantially positive locked connection may be obtained simply by providing coengaging teeth, ribs, knurling, etc. on adjacent cooperating surfaces of the shaft stem and connecting hub recess in any embodiment of the invention.

It will be further appreciated that the improved connections of the present invention are such as to be especially suited for use with articles formed of plastic compositions and other fragile materials inasmuch as the spring collar device employed in any embodiment is so designed as to reinforce the material of the connecting hub and otherwise bolster the same in firm, positive, clamped engagement with the shaft stem at all times, and thereby practically eliminate any possibility of splitting or breaking of the connecting hub incident to strain taking place in the connection when employed either as a rotary panel knob or push-pull handle device.

Though the description and drawings refer to the invention as incorporated in a panel knob such as used in radio apparatus, for example, it will be understood that the connecting means disclosed is equally applicable wherever any article of manufacture is to be secured to a shaft, rod, spindle, etc., or in any installation in which an operating member is to be mounted by sliding over the end of a shaft or applied to a shaft stem to effect axial movements thereto or for the purpose of transmitting or receiving a relatively small torque.

And while the invention has been described in detail with specific examples, such examples are intended as illustrations only, since it will be apparent to those skilled in the art that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. In a connection, a part comprising a connecting hub having an outer shaft bearing surface including an axial recess, a cooperating part comprising a shaft adapted to seat against said outer surface of the hub in said axial recess, and a fastener comprising a shaft engaging section and securing sections securing the fastener to said hub with said shaft engaging section opposite said outer surface of the hub, said shaft engaging section of the fastener and the axial recess on said outer surface of the hub cooperating to define a socket opening receiving said shaft in frictional, gripping relation therewith.

2. In a connection, a part comprising a connecting hub having an outer shaft bearing surface including an axial recess, a cooperating part comprising a shaft adapted to seat against said outer surface of the hub in said axial recess and having a flat side face, and a fastener comprising a strip of metal having bends providing a shaft engaging section and securing sections securing the fastener to said hub with said shaft engaging section opposite said outer surface of the hub, said shaft engaging section of the fastener and the axial recess on said outer surface of the hub cooperating to define a socket opening having a flat side wall, said socket opening receiving said shaft in frictional gripping relation therewith with said flat side face of the shaft abutting said flat side wall of the socket opening.

3. In a connection, a part comprising a connecting hub having an outer shaft bearing surface including an axial recess, a cooperating part comprising a shaft adapted to seat against said outer surface of the hub in said axial recess, and a fastener comprising a strip of metal having bends providing a shaft engaging section and securing sections securing the fastener to said hub with said shaft engaging section opposite said outer surface of the hub, said shaft engaging section of the fastener and the axial recess on said outer surface of the hub cooperating to define a socket opening receiving said shaft in frictional, gripping relation therewith.

4. In a connection, a part comprising a connecting hub having an outer shaft bearing surface, a cooperating part comprising a shaft adapted to seat against said outer bearing surface of the hub, and a fastener embracing said hub comprising a strip of metal having bends providing a shaft engaging section and means securing the fastener to said hub with said shaft engaging section opposite said outer bearing surface of the hub, said shaft engaging section of the fastener and said outer bearing surface of the hub cooperating to define a socket opening receiving said shaft in frictional, gripping relation therewith.

5. In a connection, a part comprising a connecting hub having an outer shaft bearing surface including an axial recess, a cooperating part comprising a shaft adapted to seat against said outer surface of the hub in said axial recess and having a flat side face, and a fastener comprising a strip of metal having a substantially flat shaft engaging section and bends providing means securing the fastener to said hub with said flat shaft engaging section opposite said outer surface of the hub, said flat shaft engaging section of the fastener and the axial recess on said outer surface of the hub cooperating to define a socket opening having a flat side wall, said socket opening receiving said shaft in frictional gripping relation therewith with said flat side face of the shaft abutting the flat side wall defined by said flat shaft engaging section of the fastener.

6. In a connection, a part comprising a connecting hub having an outer shaft bearing surface including an axial recess provided with a substantially semicircular side wall, a cooperating part comprising a generally round shaft adapted to seat against said outer surface of the hub in said axial recess, and a fastener comprising a strip of metal having bends defining a shaft engaging section including a corrugation and means securing the fastener to said hub with said shaft engaging section opposite said outer surface of the hub, said corrugation on the shaft engaging section of the fastener and said semicircular axial recess on the outer surface of the hub cooperating to define a generally round socket opening receiving said generally round shaft in frictional, gripping relation therewith.

7. In a connection, a part comprising a connecting hub having an outer shaft bearing surface including an axial recess provided with a flat side wall, a cooperating part comprising a shaft having a flat side face and adapted to seat against said outer bearing surface of the hub with said flat side face abutting the flat side wall of said axial recess, and a fastener comprising a strip of metal having bends defining a shaft engaging section and means securing the fastener to said hub with said shaft engaging section opposite said outer surface of the hub, said shaft engaging section of the fastener and the axial recess on said outer surface of the hub cooperating to define a socket opening receiving said shaft in frictional, gripping relation therewith.

GEORGE A. TINNERMAN.